(12) United States Patent
Sage, Jr.

(10) Patent No.: US 6,912,970 B2
(45) Date of Patent: Jul. 5, 2005

(54) ANIMAL NOURISHMENT BOWL

(76) Inventor: James R. Sage, Jr., 10895 Rte. 59, Cyclone, PA (US) 16726

(*) Notice: Subject to any disclaimer, the term of this patent is extended or adjusted under 35 U.S.C. 154(b) by 0 days.

(21) Appl. No.: 10/642,321

(22) Filed: Aug. 18, 2003

(65) Prior Publication Data

US 2005/0039690 A1 Feb. 24, 2005

(51) Int. Cl.$^7$ ................................................. A01K 5/01
(52) U.S. Cl. .................................. 119/61.5; 119/61.54
(58) Field of Search ............................ 119/61.5, 61.54, 119/61.55, 61.53, 72; D30/121, 129, 130

(56) References Cited

U.S. PATENT DOCUMENTS

| | | | | | |
|---|---|---|---|---|---|
| 2,584,301 | A | * | 2/1952 | Sinclair | 119/61.53 |
| 4,905,629 | A | * | 3/1990 | Hand et al. | 119/61.53 |
| 5,588,395 | A | * | 12/1996 | Lee | 119/72 |
| 5,979,361 | A | * | 11/1999 | Willinger | 119/61.54 |
| D467,044 | S | * | 12/2002 | Tangolics | D30/129 |
| D467,687 | S | * | 12/2002 | Tangolics | D30/129 |
| D472,021 | S | * | 3/2003 | Northrop | D30/129 |
| D472,350 | S | * | 3/2003 | Northrop et al. | D30/121 |

* cited by examiner

Primary Examiner—Teri Pham Luu
Assistant Examiner—Elizabeth Shaw
(74) Attorney, Agent, or Firm—Ansel M. Schwartz

(57) ABSTRACT

An animal nourishment bowl including a triangular shaped perimeter having a first wall, a second wall in connection with the first wall, and a third wall in connection with the first wall and the second wall, and an apex located adjacent where the first wall connects with the third wall. The bowl includes a floor connected to the first wall, second wall and third wall in slanted relationship so the floor angles from the second wall down to the apex so nourishment in the bowl has a tendency to move along the floor toward the apex under actions of the animal and gravity. The floor and walls define a container to hold the nourishment. A method for feeding an animal including the steps of pouring nourishment into a first bowl having a triangular shape and with a slanted floor where the nourishment collects at an apex of the bowl, which is the lowest point of the floor in the bowl relative to ground. There is the step of refilling the bowl with nourishment.

6 Claims, 4 Drawing Sheets

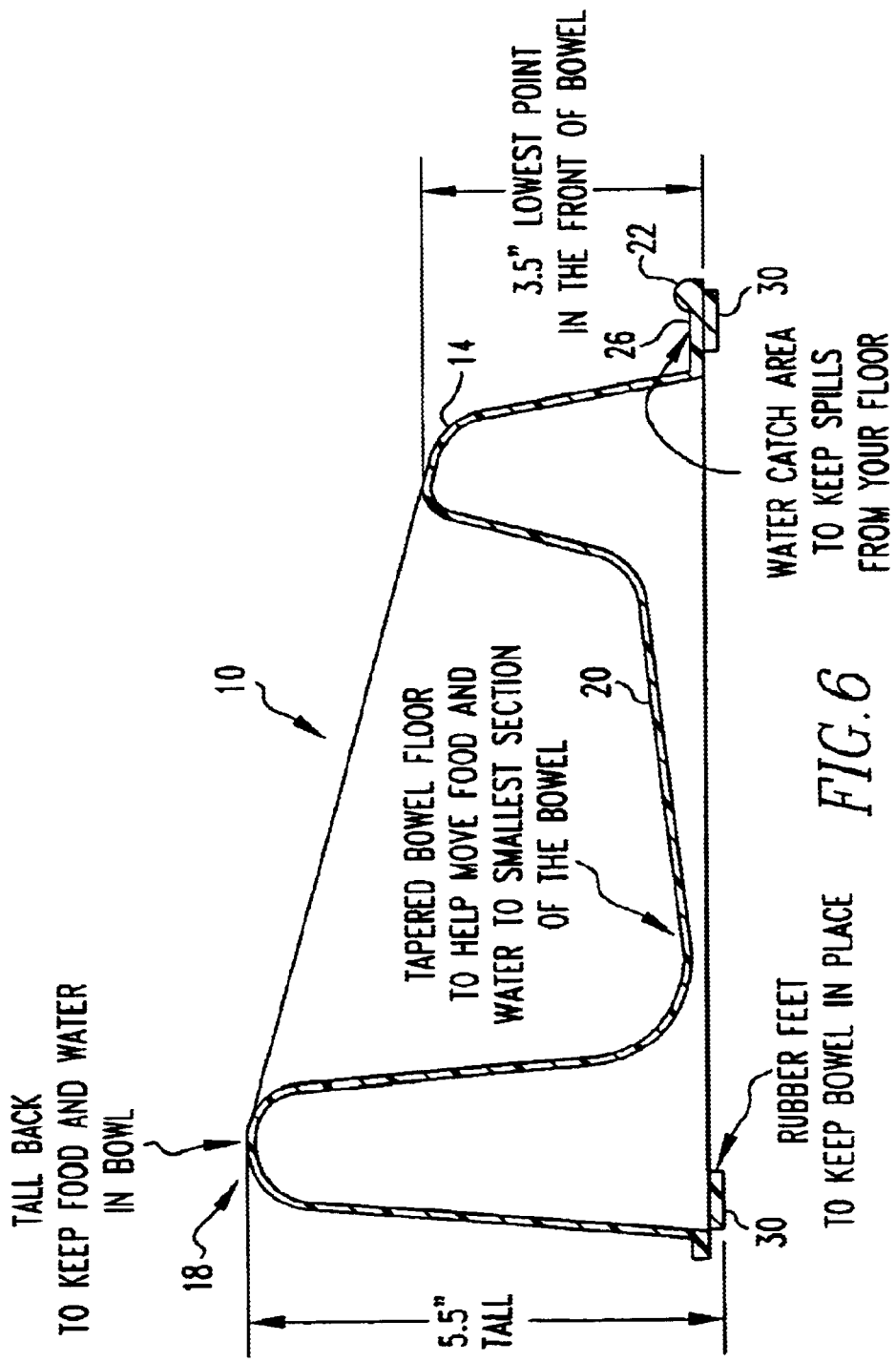

ANIMAL NOURISHMENT BOWL

FIELD OF THE INVENTION

The present invention is related to animal nourishment bowls. More specifically, the present invention is related to animal nourishment bowls having a tapered floor where the nourishment collects at the lowest point of the floor.

BACKGROUND OF THE INVENTION

A common experience shared by pet owners is the mess that results when a pet eats or drinks from a bowl. In their desire to eat food from the bowl, the pet pushes against the inner walls of the bowl to access the food, causing the bowl to move around the room, or even tip, making a further mess. By the food being evenly distributed throughout the bowl, as the pet eats, the pet has to maneuver around the bowl to obtain all the nourishment that is in the bowl.

The present invention addresses all of these concerns. It allows the bowl to be placed in a corner of a room, to be out of the way and not move around under the action of the pet eating, and it prevents the bowl from tipping, and allows food and water to gravitate towards a given point in the bowl.

SUMMARY OF THE INVENTION

The present invention pertains to an animal nourishment bowl. The bowl comprises a triangular shaped perimeter having a first wall, a second wall in connection with the first wall, and a third wall in connection with the first wall and the second wall, and an apex located adjacent where the first wall connects with the third wall. The bowl comprises a floor connected to the first wall, second wall 14 and third wall 16 in slanted relationship so the floor angles from the second wall down to the apex so nourishment in the bowl has a tendency to move along the floor toward the apex under actions of the animal and gravity. The floor and walls define a container to hold the nourishment.

The present invention pertains to a method for feeding an animal. The method comprises the steps of pouring nourishment into a first bowl having a triangular shape and with a slanted floor where the nourishment collects at an apex of the bowl, which is the lowest point of the floor in the bowl relative to ground. There is the step of refilling the bowl with nourishment.

BRIEF DESCRIPTION OF THE DRAWINGS

In the accompanying drawings, the preferred embodiment of the invention and preferred methods of practicing the invention are illustrated in which:

FIG. 6 is a cross-sectional view of the bowl.

DETAILED DESCRIPTION

Figure 1:
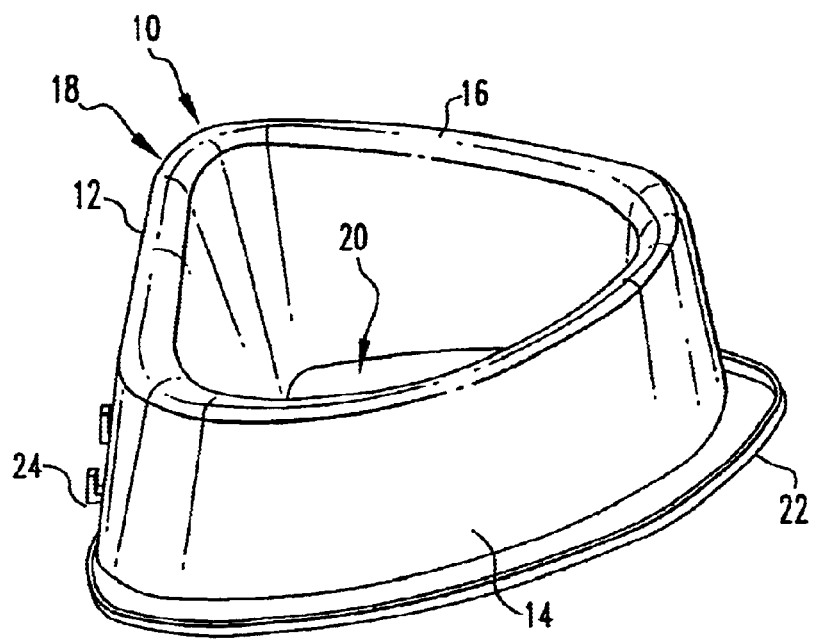
FIG. 1 is a perspective view from the second wall of the bowl of the present invention.
Figure 2:
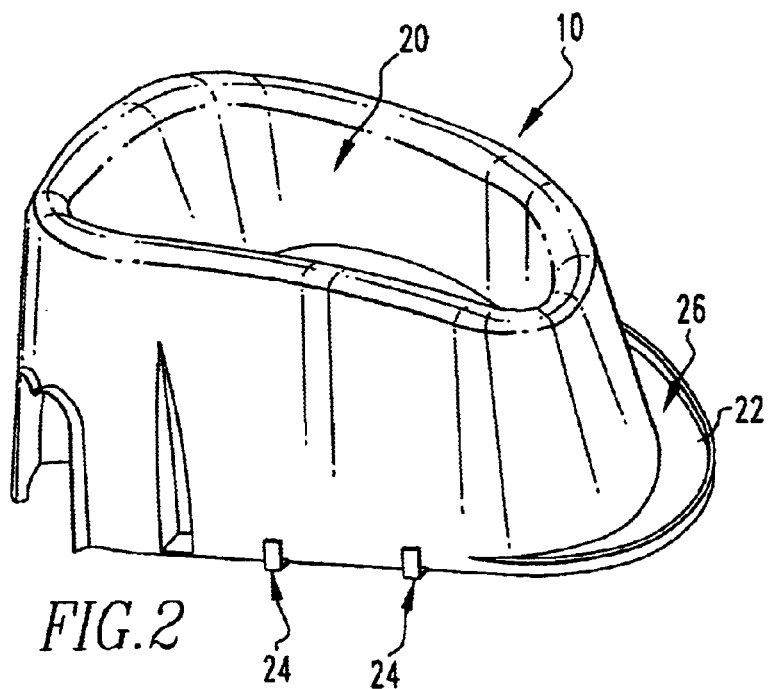
FIG. 2 is a perspective view from the first wall of the bowl.
Figure 3:
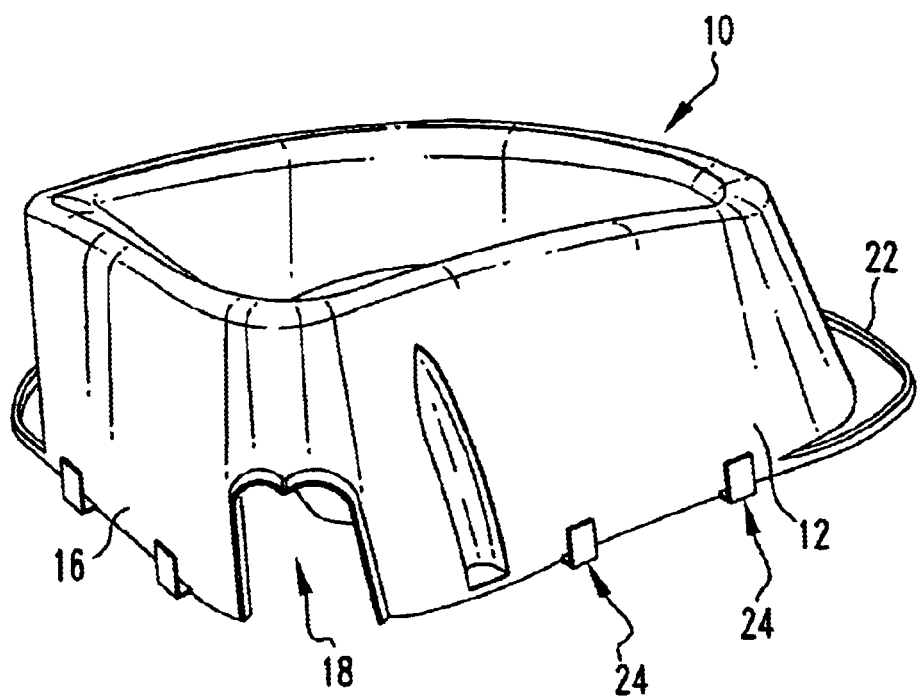
FIG. 3 is a perspective view from the apex of the bowl.
Figure 4:
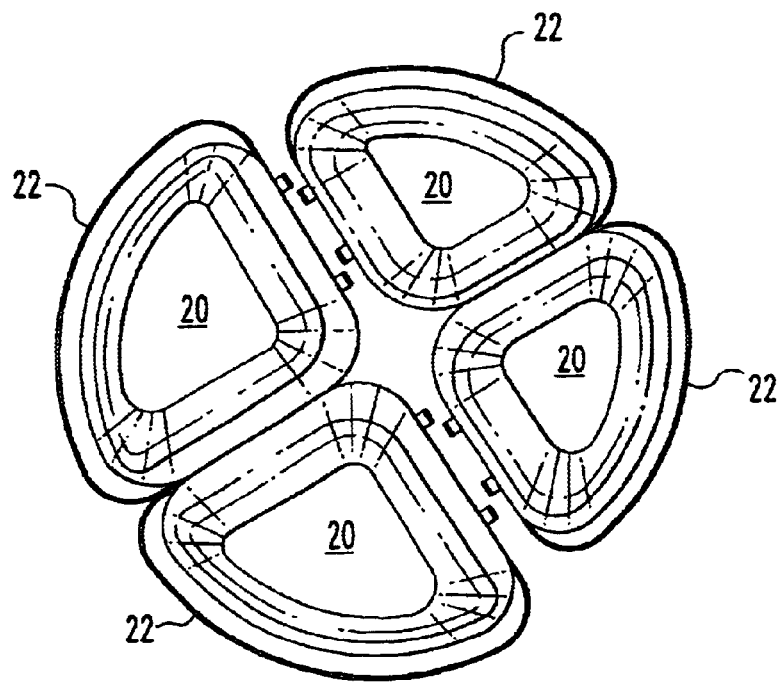
FIGS. 4 and 5 are overhead views of several bowls of the present invention connected together.
Figure 5:
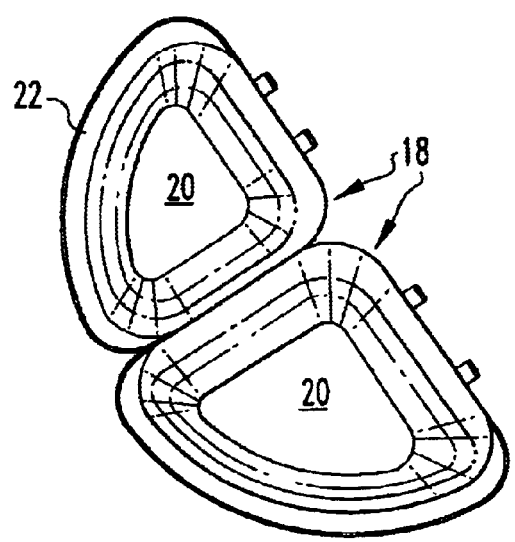

Referring now to the drawings wherein like reference numerals refer to similar or identical parts throughout the several views, and more specifically to FIGS. 1–6 thereof, there is shown an animal nourishment bowl 10. The bowl 10 comprises a triangular shaped perimeter having a first wall 12, a second wall 14 in connection with the first wall 12, and a third wall 16 in connection with the first wall 12 and the second wall 14, and an apex 18 located adjacent where the first wall 12 connects with the third wall 16. The bowl 10 comprises a floor 20 connected to the first wall 12, second wall 14 and third wall 16 in slanted relationship so the floor 20 angles from the second wall 14 down to the apex 18 so nourishment in the bowl 10 has a tendency to move along the floor 20 toward the apex 18 under actions of the animal and gravity. The floor 20 and walls define a container to hold the nourishment.

Preferably, the bowl 10 includes a lip 22 extending from the base of the second wall 14 to prevent the bowl 10 from tipping. The bowl 10 preferably includes a connector 24 extending from the first wall 12 to mate with another bowl 10. Preferably, the apex 18 of the bowl 10 has a height greatest where the first wall 12 connects with the third wall 16, and the height of the first wall 12 and the third wall 16 tapers down to the second wall 14.

The present invention pertains to a method for feeding an animal. The method comprises the steps of pouring nourishment into a first bowl 10 having a triangular shape and with a slanted floor 20 where the nourishment collects at an apex 18 of the bowl 10, which is the lowest point of the floor 20 in the bowl 10 relative to ground. There is the step of refilling the bowl 10 with nourishment. Preferably, there is the step of connecting a second bowl 10 to the first bowl 10 to a connector 24 which extends from the first bowl 10.

In the operation of the invention, the apex 18 has a tall back (about 5.5 in. high) relative to the rest of the bowl 10, with the first wall 12 and the third wall 16 tapering down to the second wall 14, which has a height of about 3.5 in. By the bowl 10 having a height distribution as identified, it serves to keep food and water in the bowl 10, where it has the greatest chance of being splashed out while the animal, such as a dog, is eating. With the second wall 14 having the lowest height, it makes it easier for the animal to reach into the bowl 10 to let it eat or drink.

The bowl 10 has a tapered floor 20 to help move food and water to the lowest point of the bowl 10. The bowl 10 has a water catch area 26 defined by the lip 22, to keep spills from reaching the floor 20. The catch area 26 also serves to prevent the bowl 10 from tipping. The bowl 10 has rubber feet 30 to keep the bowl 10 in place and not move around. The bowl 10, by having a triangular shape, is able to fit into corners, where it is both out of the way and maintained well in position by being at the corner.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. An animal nourishment bowl comprising:

a triangular shaped perimeter having a first wall, a second wall in connection with the first wall, and a third wall in connection with the first wall and the second wall, and an apex located adjacent where the first wall connects with the third wall; and a floor connected to the first wall, second wall and third wall in slanted relationship so the floor angles from the second wall down to the apex so nourishment in the bowl has a tendency to move along the floor toward the apex under actions of the animal and gravity, the floor and walls defining a container to hold the nourishment.

2. A bowl as described in claim 1 including a lip extending from the base of the second wall to prevent the bowl from tipping.

3. A bowl as described in claim 2 including a connector extending from the first wall to mate with another bowl.

4. A bowl as described in claim 3 wherein the apex of the bowl has a height greatest where the first wall connects with the third wall, and the height of the first wall and the third wall tapers down to the second wall.

5. A method for feeding an animal comprising the steps of:

pouring nourishment into a first bowl having a triangular shaped perimeter having a first wall, a second wall in connection with the first wall and a third wall in connection with the first and second wall and an apex located adjacent where the first wall connects with the third wall with a slanted floor where the nourishment collects at the apex of the bowl, which is the lowest point of the floor in the bowl relative to ground so nourishment in the bowl has a tendency to move along the floor toward the apex under actions of the animal and gravity; and refilling the bowl with nourishment.

6. A method as described in claim 5 including the step of connecting a second bowl to the first bowl to a connector which extends from the first bowl.

\* \* \* \* \*